(12) United States Patent
De Miceli et al.

(10) Patent No.: US 7,416,399 B2
(45) Date of Patent: Aug. 26, 2008

(54) HANDHELD EXTRUDER WELDING DEVICE

(75) Inventors: Guiseppe De Miceli, Menziken (DE); Hans Arnold, Kägiswil (CH)

(73) Assignee: Leister Process Technologies, Sarnen (CH)

( * ) Notice: Subject to any disclaimer, the term of this patent is extended or adjusted under 35 U.S.C. 154(b) by 270 days.

(21) Appl. No.: 11/219,011

(22) Filed: Sep. 2, 2005

(65) Prior Publication Data
US 2006/0057241 A1 Mar. 16, 2006

(30) Foreign Application Priority Data
Sep. 8, 2004 (EP) .................. 04021265

(51) Int. Cl.
*B65D 88/54* (2006.01)
(52) U.S. Cl. .......... 425/318; 222/413; 222/324; 222/504; 222/333
(58) Field of Classification Search .......... 222/413, 222/324, 504, 333, 142.1, 142.3, 144, 182; 425/318
See application file for complete search history.

(56) References Cited

U.S. PATENT DOCUMENTS

| 3,750,905 A | | 8/1973 | Wolfrom | |
|---|---|---|---|---|
| 3,953,006 A | | 4/1976 | Patarcity et al. | |
| 5,005,731 A | * | 4/1991 | Koehler et al. | ............... 222/413 |
| 5,693,276 A | * | 12/1997 | Weissfloch | ................. 425/458 |
| 6,123,233 A | * | 9/2000 | Nussbaumer | ............... 222/504 |
| 6,431,409 B1 | * | 8/2002 | Gehde | ........................ 222/334 |

FOREIGN PATENT DOCUMENTS

| DE | 90 10 633.4 | 7/1990 |
|---|---|---|
| DE | 0 594 889 A1 | 5/1994 |
| DE | 199 52 166 A1 | 5/2001 |
| EP | 0 887 116 A2 | 12/1998 |

OTHER PUBLICATIONS

European Search Report for corresponding Application No. 04021265.6 dated Mar. 10, 2005.

* cited by examiner

*Primary Examiner*—Yogendra Gupta
*Assistant Examiner*—Thu Khanh T Nguyen
(74) *Attorney, Agent, or Firm*—Renner, Otto, Boisselle & Sklar, LLP

(57) ABSTRACT

Handheld extruder welding device for welding thermoplastic synthetic materials, including an extrusion screw with an attachment shaft and a device for the axial attachment of the extrusion screw with the attachment shaft to a gear-equipped drive system; where a one-piece gear housing for holding the gear is equipped with a front-side bearing flange for accepting the extrusion screw; where an output shaft arranged in the bearing flange has an output gear attached to it at the cup-side end and has an opening for inserting the attachment shaft; where a two-part annular clamping flange for clamping the extrusion screw in the bearing flange is provided; and where the clamping flange can be placed on the bearing flange from outside and can be clamped. In addition, the clamping flange may contain at least one feed channel for the welding wire. This design offers a compact, stable, and short gear output where the extrusion screw can be exchanged easily.

11 Claims, 7 Drawing Sheets

HANDHELD EXTRUDER WELDING DEVICE

TECHNICAL FIELD

This invention concerns a handheld extruder welding device for welding thermoplastic synthetic materials, including an extrusion screw with an attachment shaft and a device for the axial attachment of the extrusion screw with the attachment shaft to a gear-equipped drive system.

BACKGROUND OF THE INVENTION

Such handheld extruder welding devices are familiar devices, and are used primarily for welding plastic panels or similar objects. The known plastic welding devices consist essentially of a handheld drill serving as the drive system and a removable attachment for this drill. The extrusion screw is mounted separately behind the gear of the handheld drill. For the welding wire, a feed channel is provided that opens behind the mount of the extrusion screw into the space surrounding the feed zone of the extrusion screw.

SUMMARY OF THE INVENTION

The invention addresses the problem of proposing a handheld extruder welding device that offers an extremely compact mount design for the extrusion screw on the gear-equipped drive system in order to keep the length of the handheld extruder welding device as short as possible.

According to the invention, this problem is solved by a handheld extruder welding device having the characteristics specified in the main claim. Additional advantageous design variants are described in the sub-claims.

According to the invention, the handheld extruder welding device has a pivoted output shaft located in the bearing flange. An output gear is mounted at the cup-side end of this shaft, and the shaft has an opening, preferably of polygonal cross-section, into which the attachment shaft of the extrusion screw is inserted. The polygonal cross-section permits an optimal transfer of the torque to the attachment shaft with simple means. The bearing flange for accepting the extrusion screw is installed on the front end of a one-piece gear housing with a cup-shaped area for holding the gear. This gear housing permits the optimal mounting of the gear as well as of the extrusion screw, and can be manufactured inexpensively.

As an advantageous characteristic, a two-part annular clamping flange for clamping the bearing flange is provided. This clamping flange can be placed on the bearing flange from the outside and rests on the bearing flange with ribs conforming to the bearing flange. This clamping flange serves for the radial clamping of the bearing flange, and is easily removed when the drive system is replaced. Depending on the design of the device as such, this clamping flange may be designed either as a simple annular part or as a cooling body with appropriate cooling surfaces.

Due to this design, the gear as well as the mount of the extrusion screw can be integrated in a single cast body. This particular design prevents an offset between the gear axis and the extrusion screw axis, minimizes the number of machine elements, permits the handheld extruder welding device to be of short length, and makes for precise mounting as well as quick disassembly of the drive system and the extrusion screw.

In order to make it possible to build a handheld extruder welding device that is as short as possible, one design variant provides for at least one feed channel for the welding wire to be incorporated in the clamping flange. Several feed channels may each have a different diameter for different welding wires. It is of advantage if the opening for inserting the welding wire is located on the side and if the exit opening is on the front face close to the extrusion screw.

Preferably, the output shaft is supported in the housing by means of a press-fitted radial-axial bearing on the extrusion screw side, and by means of a grooved ball bearing on the gear side.

In order to hold the clamping flange in position axially, the clamping flange is preferably equipped with an annular cut, and the halves of the clamping flange are preferably pulled together by means of bolt connections. In addition, it would be practical to include torsion preventers for the clamping flange halves in the housing. A handheld extruder welding device of this design is distinguished by a structure that is very compact in this field, and is also suited for robust operation. In particular, a handheld extruder welding device of this design permits the integration of the gear-equipped drive system and of a heating system in a single housing. At the same time, the special design of the gear housing permits a compact structure in which the extrusion screw is held in place with simple means.

Below, the invention is explained in detail with the help of a design variant.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
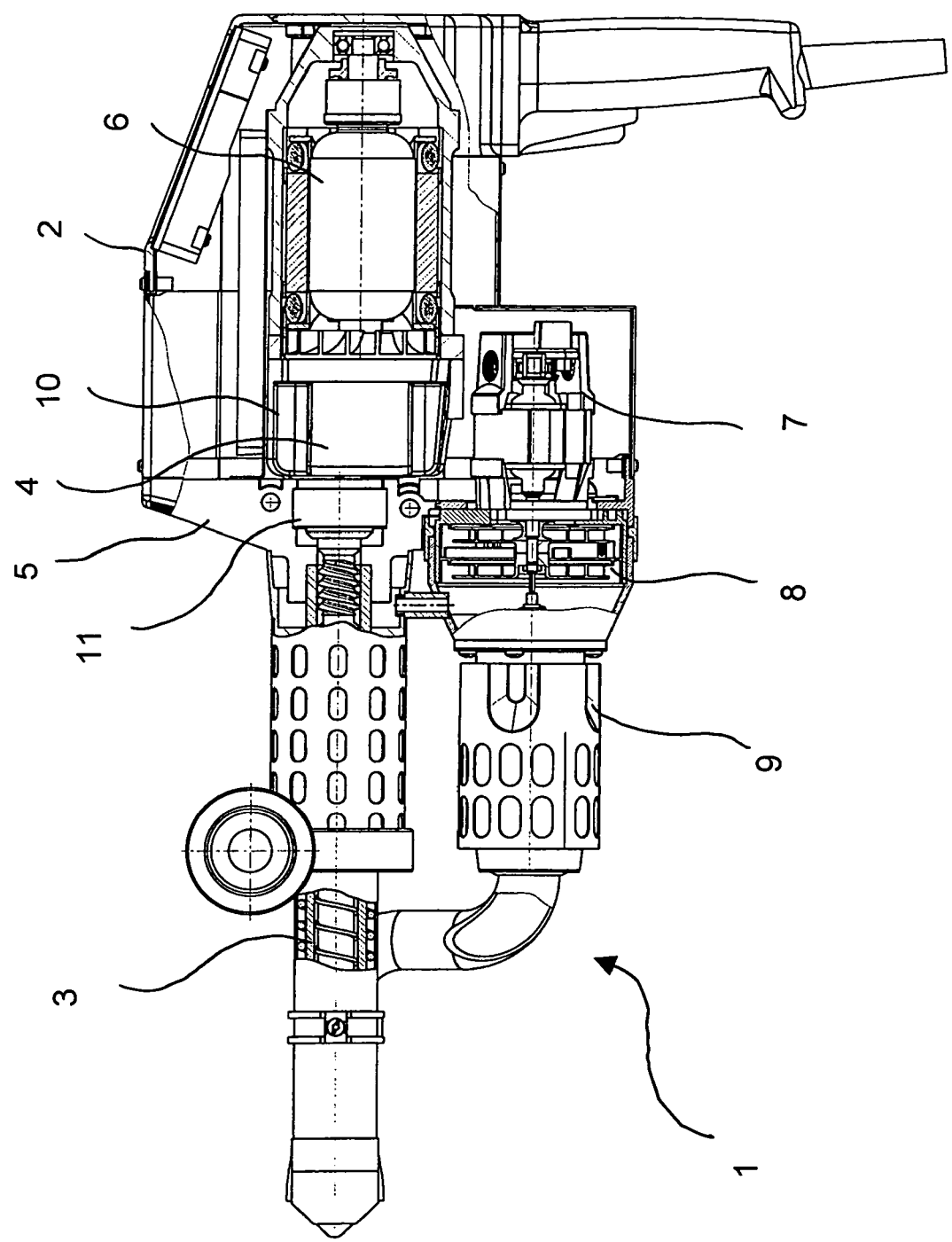
FIG. 1 shows a longitudinal section through a handheld extruder welding device with a housing in which the drive system and the heating system are integrated.

FIG. 1 shows a longitudinal section through a handheld extruder welding device 1 with a housing 2, preferably including two half-shells, in which a drive motor 6 with a gear 4 as well as a blower motor 7 with blower 8 are integrated. The heating system 9 follows the blower 8. The gear 4 has a housing 10 into whose bearing flange 11 an extrusion screw 3 can be inserted axially. For holding the extrusion screw 3 radially in the bearing flange 11, it is pulled together via a two-part cooling body 5 that also acts as clamping flange.

Figure 2:
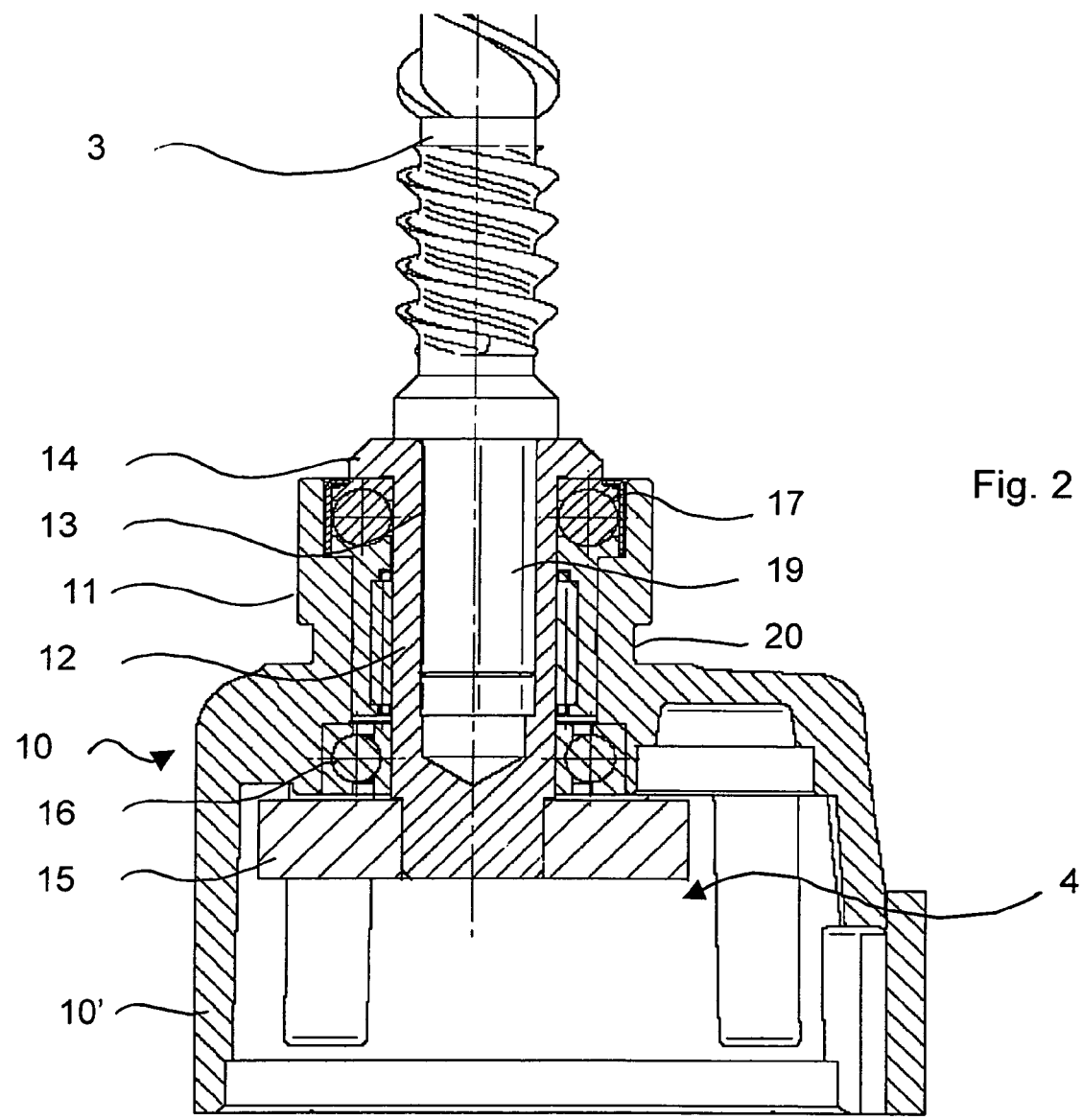
FIG. 2 shows a longitudinal section through the gear output.

FIG. 2 shows an enlarged view of the chill-cast housing 10 that accepts the individual components of the gear in an extension 10', and has at its other end a bearing flange 11 for accepting the extrusion screw 3. In the bearing flange 11, the output shaft 12 is located that is pushed from the front end into the hole 13 in the bearing flange 11 up to the stop 14. In front of the transition zone to the extension 10', the bearing flange 11 has an annular groove 20 to be engaged by a clamping flange consisting, for example, of the cooling body 5. The clamping flange includes of at least two halves, and the desired clamping of the bearing flange 11 is achieved by tensioning the two halves. Via the undercut at the bearing flange 11, the clamping flange transfers the force back into the axial bearing 17 on the extrusion screw side. An output gear 15 is press-fitted at the other end of the bearing flange 11 so that the output shaft 12 is held in position axially.

On the gear side, the output shaft 12 is supported in the bearing flange 11 by means of a grooved ball bearing 16 press-fitted into the housing 10, and on the extrusion screw side is supported by a radial-axial needle bearing 17 press-fitted into the housing 10.

Figure 3:
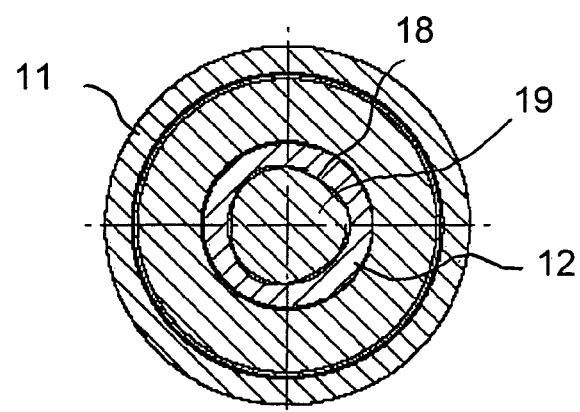
FIG. 3 shows a cross-section through the bearing flange with the extrusion screw inserted.

FIG. 3 illustrates the design of the hole 18 in the output shaft 12. Like the shaft 19 of the extrusion screw 3, it has a polygonal cross-section for an optimal transfer of the torque, while simultaneously permitting a simple alignment of the extrusion screw 3 in the output shaft 12. This design makes it possible to produce a standard output torque of 13 Nm and a maximum output torque of approximately 20 Nm.

Figure 4:
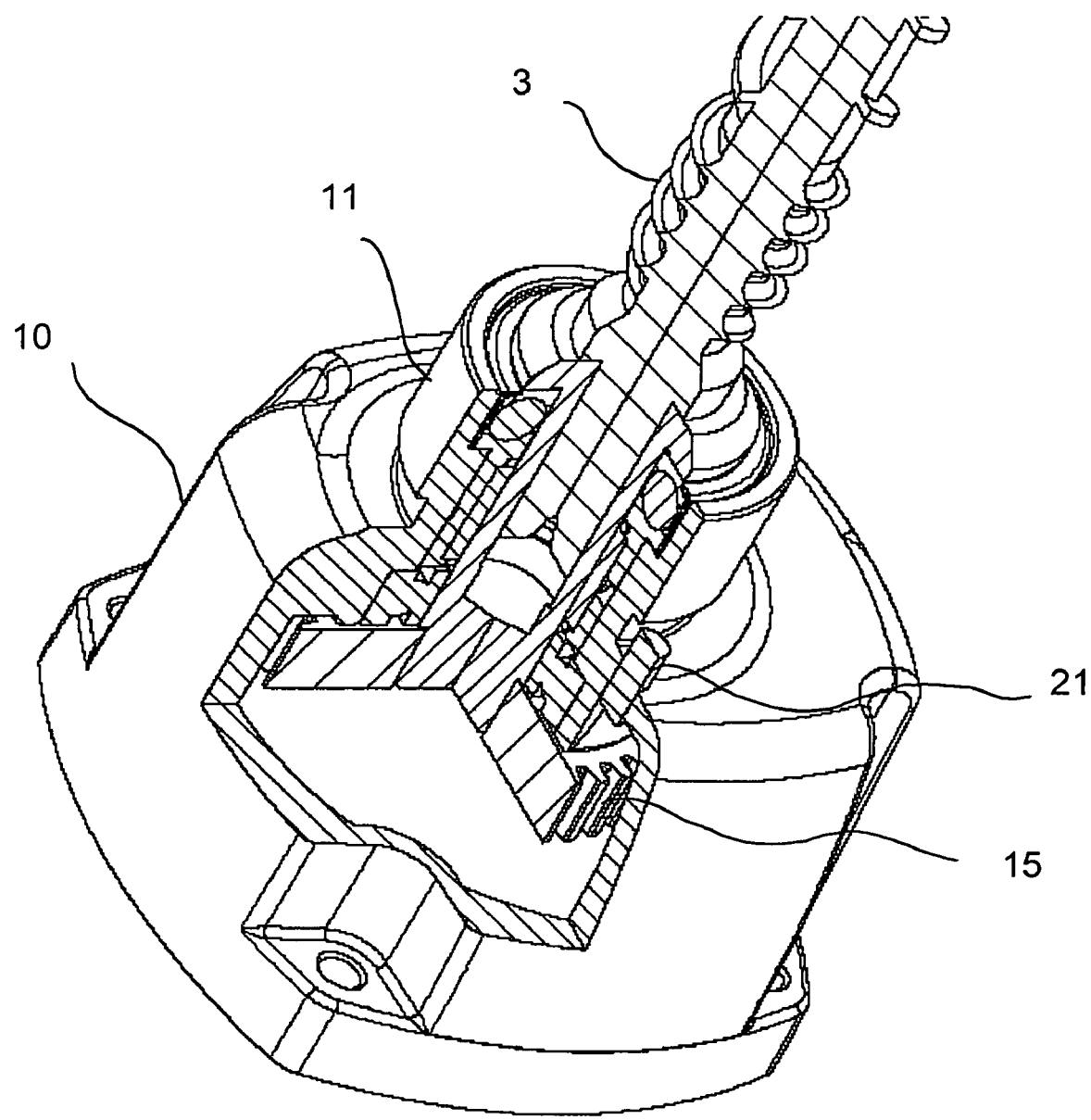
FIG. 4 shows a perspective view of the gear housing with extrusion screw, partially cut open.

FIG. 4 shows the complete assembly of the gear housing 10 with the torsion-preventing pins 21 that are press-fitted into the housing 10 and engage corresponding slots in the clamping flange.

Figure 6:
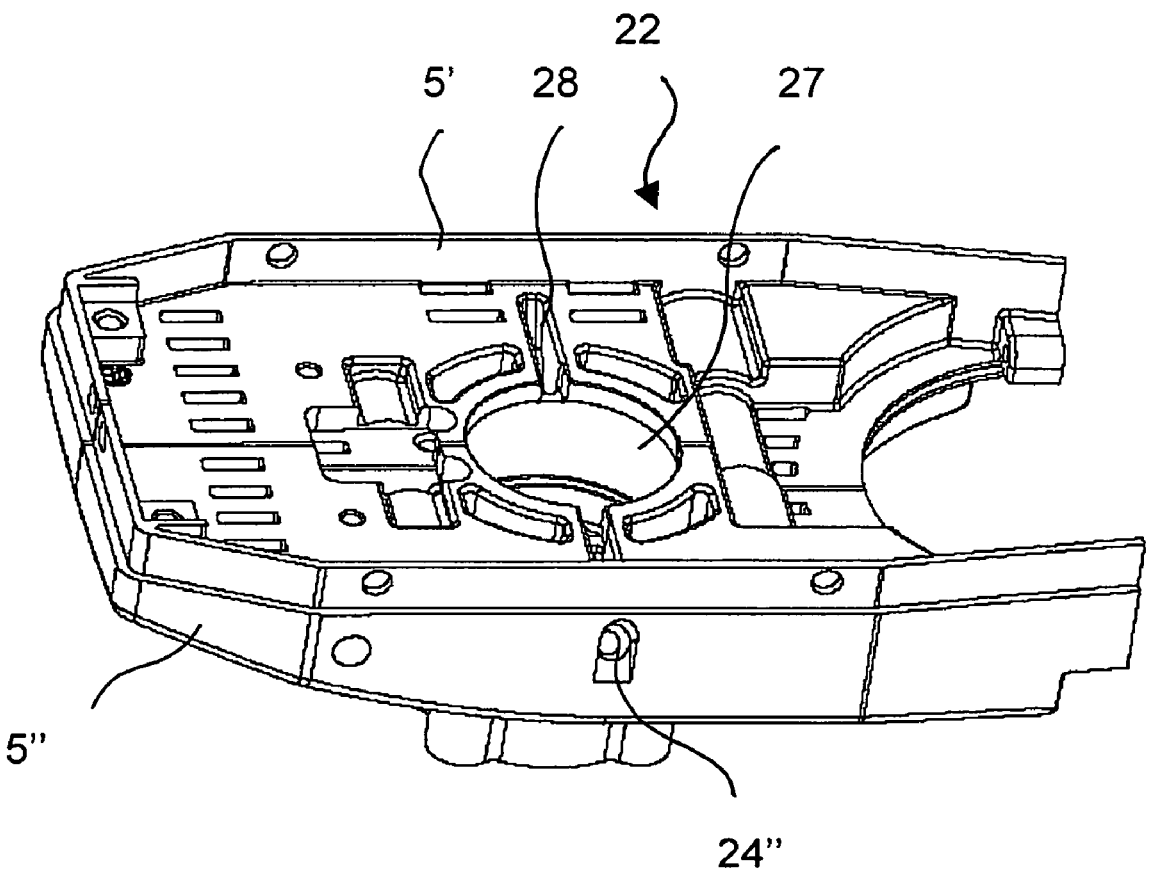
FIG. 6 shows the back of the two-part cooling body.

As mentioned above, different designs may be used for the part commonly referred to as clamping flange that is acting on the bearing flange 11. In the design variant shown in FIG. 1, the cooling body 5 also assumes the function of the clamping flange. In the cooling body 5, feed channels 24, 24' are provided that open into the feed zone of the extrusion screw 3. The feed channels 24, 24' have different diameters so that welding wires of different diameters can be inserted. In the cooling body 5, including the two cooling body halves 5' and 5", corresponding half-round ribs 27 are installed whose ends engage the groove 20 and that rest on the bearing flange 11. The appropriate contact pressure is generated by tensioning the cooling body halves 5' and 5" by means of suitable bolt connections, The inside of the two cooling body halves 5' and 5" is shown in FIG. 6. The cross-wise slots 28 serve to engage the pins 21 in order to provide additional torsion protection. The openings 22 accept bolt connections.

Figure 7:
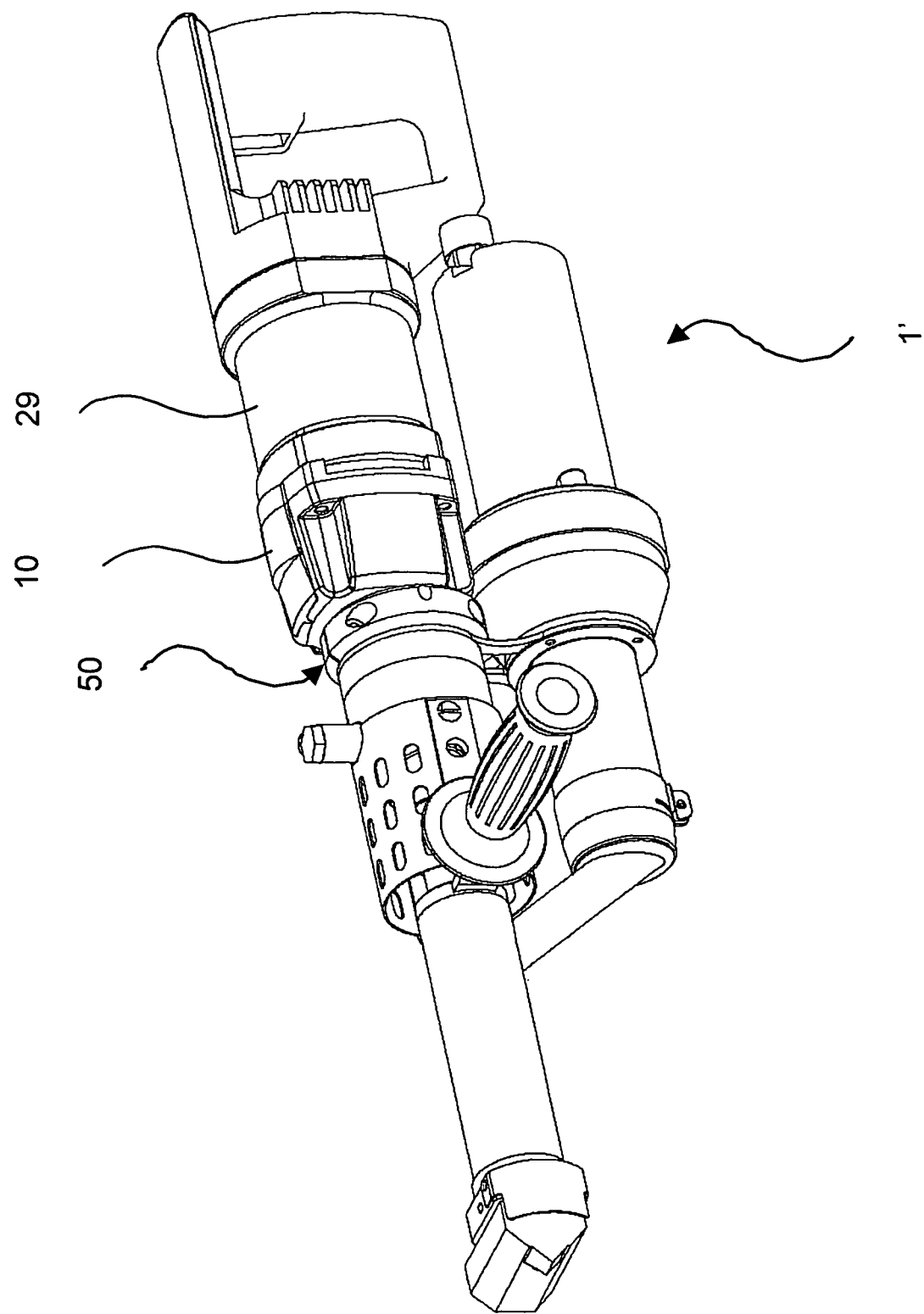
FIG. 7 shows a different design variant of a handheld extruder welding device without a housing enclosing the drive system and blower.

FIG. 7 shows a different design of a handheld extruder welding device 1' where the gear housing 10 is attached directly to the housing 29 surrounding a drive system. As a consequence, only one annular clamping flange 50, also including two halves, is provided.

Figure 5:
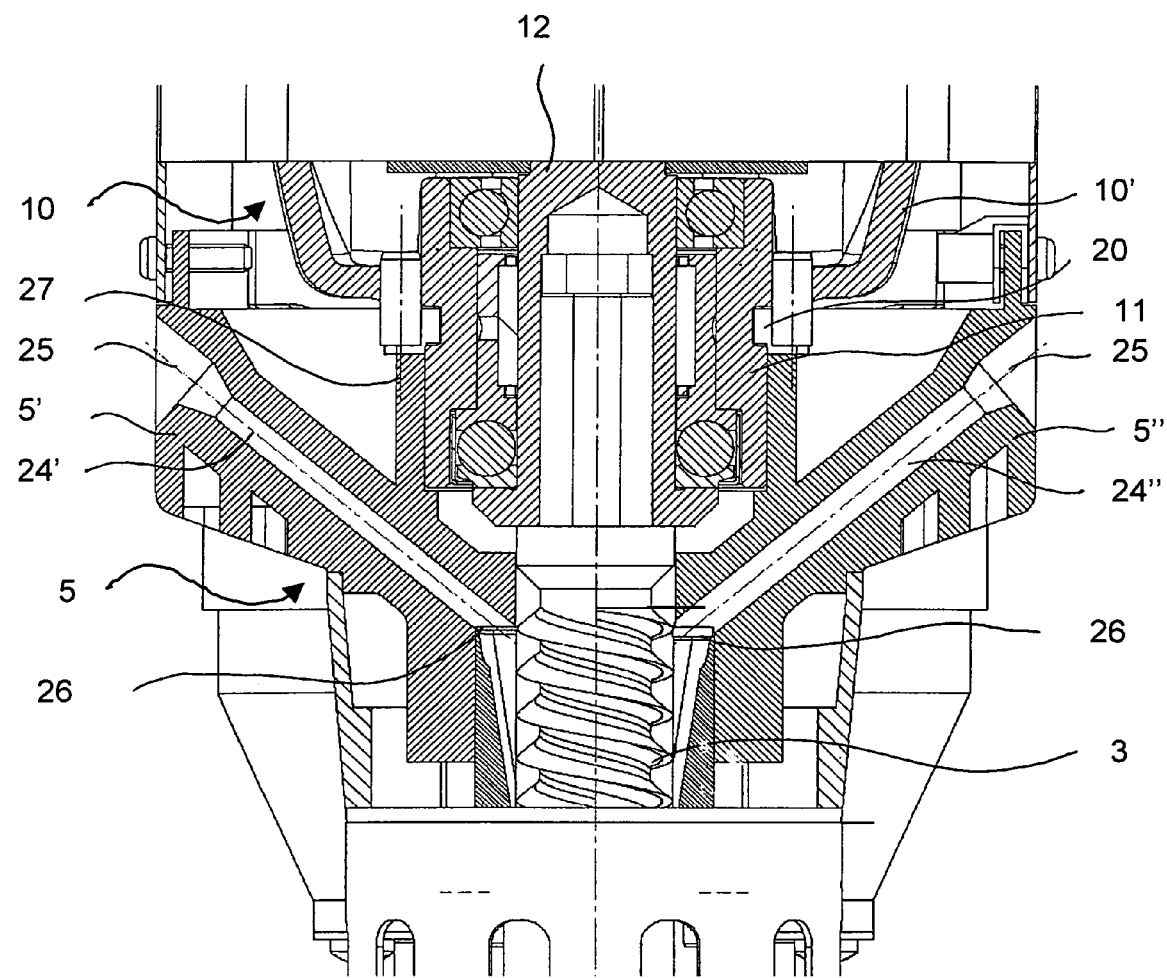
FIG. 5 shows an enlarged partial section through the cooling body and the gear housing of the handheld extruder welding device referred to in FIG. 1.
Figure 8A:
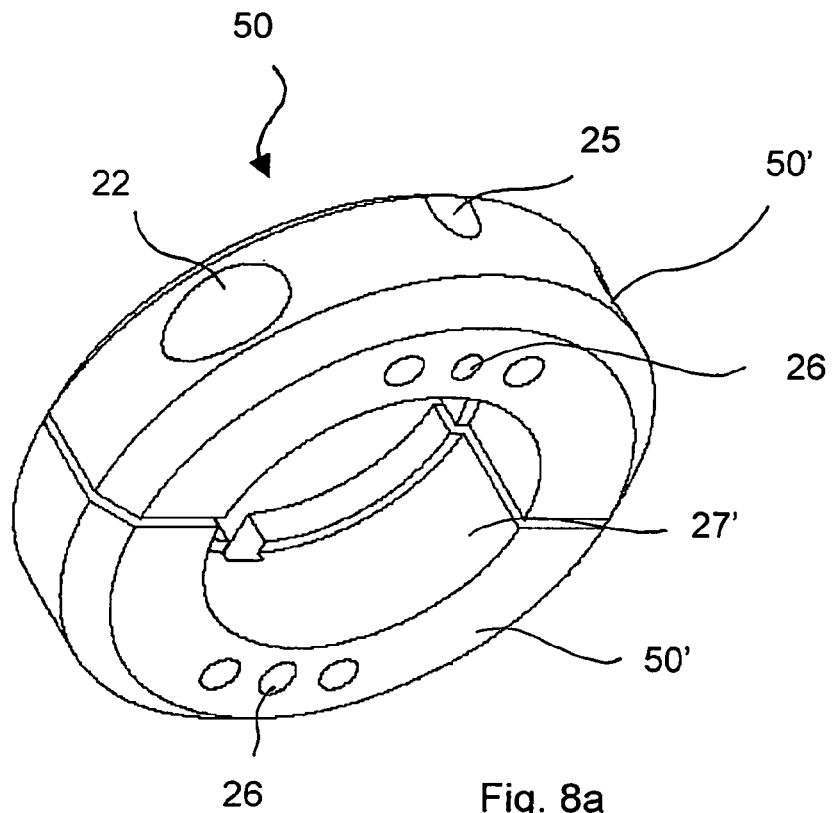
FIG. 8 shows various perspective views of the clamping flange for the handheld extruder welding device in FIG. 7, from the front (FIG. 8a) and from the back (FIG. 8b).
Figure 8B:
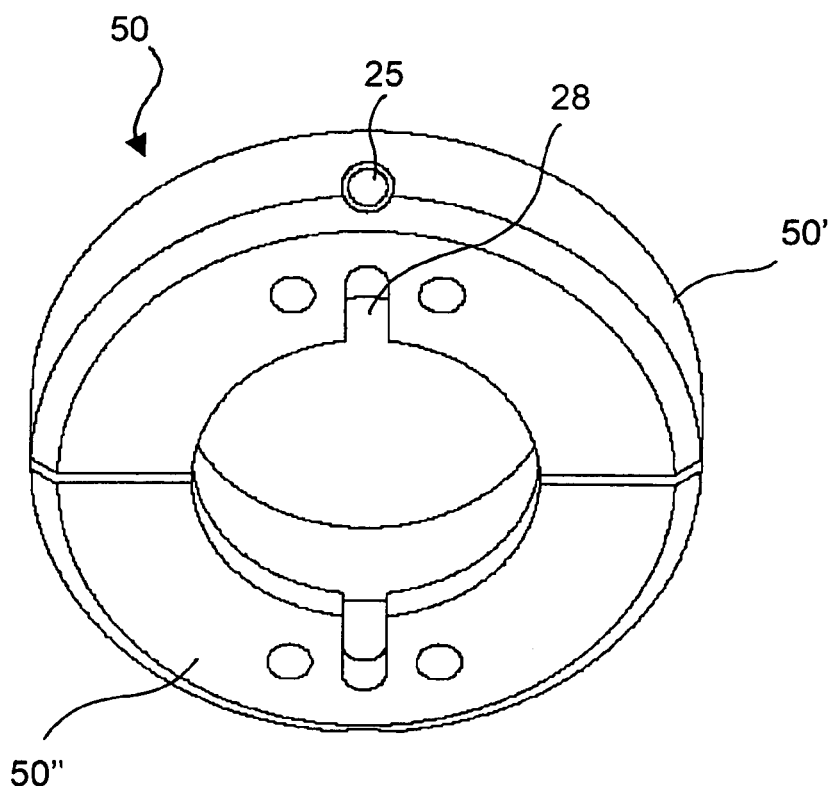

In FIG. 8a, the clamping flange 50 with the two clamping flange halves 50' and 50" is shown from the front, showing the elements that were already described in connection with the cooling body 5 and that are here identified by the same numbers. The end of the rib 27' engages the groove 20 on the bearing flange 11. The feed opening 25 of each feed channel 24', 24" is located on the side, and the exit opening 26 is located on the front of the clamping flange 50' or 50" (or 5' and 5" in FIG. 5). FIG. 8b shows the back of the clamping flange 50.

The invention claimed is:

1. A handheld extruder welding device for welding thermoplastic synthetic materials, comprising:
   an extrusion screw with an attachment shaft, and
   a device for the axial attachment of the extrusion screw with the attachment shaft to a drive system equipped with a gear and with a one-piece gear housing with a cup-shaped area for holding the gear and a front-side bearing flange for accepting the extrusion screw,
   wherein a pivoted output shaft is located in the bearing flange, and an output gear is mounted at the cup-side end of the output shaft, and the output shaft has an opening into which the attachment shaft of the extrusion screw is inserted.

2. A handheld extruder welding device according to claim 1, wherein at least one two-part clamping flange, comprising two clamping flange halves, can be placed from the outside transversely onto the bearing flange in order to clamp the bearing flange, and rests on the bearing flange with ribs conforming to the bearing flange.

3. A handheld extruder welding device according to claim 2, wherein the clamping flange contains at least one feed channel for a welding wire.

4. A handheld extruder welding device according to claim 3, wherein the input opening of the feed channel is on the side, and its exit opening on the front face of the clamping flange.

5. A handheld extruder welding device according to claim 1, wherein the bearing flange has an annular cut for holding the clamping flange in position axially.

6. A handheld extruder welding device according to claim 2, wherein the bearing flange has an annular cut for holding the clamping flange in position axially.

7. A handheld extruder welding device according to claim 3, wherein the bearing flange has an annular cut for holding the clamping flange in position axially.

8. A handheld extruder welding device according to claim 4, wherein the bearing flange has an annular cut for holding the clamping flange in position axially.

9. A handheld extruder welding device according to claim 5, wherein the halves of the clamping flange are pulled together by means of bolt connections.

10. A handheld extruder welding device according to claim 5, wherein the housing is equipped with torsion preventers for the clamping flange halves.

11. A handheld extruder welding device according to claim 9, wherein the housing is equipped with torsion preventers for the clamping flange halves.

* * * * *